(12) United States Patent
Miller et al.

(10) Patent No.: US 7,984,553 B1
(45) Date of Patent: Jul. 26, 2011

(54) CABLE PREPARATION TOOL

(76) Inventors: Michael R. Miller, Williamsport, PA (US); Scott A. Dangle, Cogan Station, PA (US)

(*) Notice: Subject to any disclaimer, the term of this patent is extended or adjusted under 35 U.S.C. 154(b) by 508 days.

(21) Appl. No.: 12/201,247

(22) Filed: Aug. 29, 2008

Related U.S. Application Data

(60) Provisional application No. 60/969,178, filed on Aug. 31, 2007.

(51) Int. Cl.
*B21F 13/00* (2006.01)
(52) U.S. Cl. ............ 30/90.1; 30/90.6; 30/90.7; 30/91.1
(58) Field of Classification Search .................. 30/90.1, 30/90.7, 90.6, 91.1, 92, 93–95, 2, 289, 278; 81/9.44, 9.4; 82/70.2, 113, 54
See application file for complete search history.

(56) References Cited

U.S. PATENT DOCUMENTS

| | | | | |
|---|---|---|---|---|
| 4,979,299 A * | 12/1990 | Bieganski | ...................... | 30/90.1 |
| 5,377,410 A * | 1/1995 | Welch | ............................. | 30/90.1 |
| 6,397,474 B1 * | 6/2002 | Losinger | ........................ | 30/90.2 |
| 6,467,171 B2 * | 10/2002 | Tarpill | ............................ | 30/90.2 |
| 6,513,244 B1 * | 2/2003 | Andreescu | .................... | 30/90.2 |
| 6,618,945 B2 * | 9/2003 | Holland et al. | ................ | 30/90.1 |
| 6,640,439 B2 * | 11/2003 | Losinger | ........................ | 30/90.2 |
| 6,725,533 B1 * | 4/2004 | Losinger | ......................... | 29/764 |
| 7,171,753 B2 * | 2/2007 | Korczak et al. | ................ | 30/90.1 |
| 7,565,740 B2 * | 7/2009 | Henningsen | .................... | 29/862 |
| 7,694,420 B2 * | 4/2010 | Ehret et al. | ..................... | 30/90.1 |
| 2004/0221456 A1 * | 11/2004 | Losinger | ........................ | 30/90.1 |

* cited by examiner

*Primary Examiner* — Boyer D Ashley
*Assistant Examiner* — Omar Flores-Sánchez
(74) *Attorney, Agent, or Firm* — John J. Elnitski, Jr.

(57) ABSTRACT

A cable preparation tool having a main body, with a cable receiving end, a cable receiving area and a manipulation end. There is a center conductor support shaft guide channel in the manipulation end to receive a center conductor support shaft. The center conductor support shaft guide channel allows for the center conductor support shaft to enter a hollow center conductor of the cable and be removed from the hollow center conductor of the cable while the cable is within the cable receiving area. There is a jacket strip slot on the main body. There is a jacket strip blade attached at the jacket strip slot. There is a blade holder slot on the main body which receives a blade holder. There is a cable cutting blade attached to the blade holder. There is a cable slug slot on the main body.

20 Claims, 16 Drawing Sheets

CABLE PREPARATION TOOL

This application claims the benefit of and incorporates by reference U.S. Provisional Application No. 60/969,178 filed Aug. 31, 2008.

BACKGROUND

The present invention generally relates to cable preparation tool for the cable TV industry. More specifically, the present invention relates to cable preparation tool for use with a hollow center conductor.

The present invention relates to the preparation of a coaxial cable with a hollow conductor for the fitting of a connector, especially coaxial cable having a corrugated outer conductor. An example of coaxial cable using a corrugated outer conductor is shown in FIG. 1. The components of the corrugated outer conductor coaxial cable 10 are a center conductor 12, dielectric 14, outer conductor 16 and an outer jacket 18. FIG. 1 shows the center conductor 12 as a hollow conductor. The outer conductor 16 is of a corrugated material with crests 20 and valleys 22. When a cable having a corrugated outer conductor is prepared to receive a connector, a hack saw is usually used to cut the cable to the approximate termination length. More precise preparation of the various cable components is then performed per the connector manufacturer's specifications.

Manufacturer's specifications usually call for unique trim dimensions of the outer jacket, outer conductor, dielectric and center conductor. The trim dimension of each cable component depends on the connector to be used. The trim dimension of any given cable component is often given in reference to another cable component. More specifically, for example, the trim dimension of the outer jacket may refer not only to a specific number of bare corrugations of the outer conductor 14 required, but whether the reference point is at the crest 20 or valley 22 of a specific corrugation. Generally, for most connectors, the trimming of the outer conductor is required at a crest of the corrugated material. Providing the proper trim dimension for each cable component requires the use of off-the-shelf hand tools (including but not limited to a tape measure, scribe, knives, diagonal cutters, pliers, hack saw, wire or nylon brush) used individually to separately prepare the different cable components. It is desired by a technician to have one tool to perform the trimming of all the cable components in one step when preparing a cable end for a connector.

It is an object of the present invention to provide a tool to prepare a coaxial cable with a hollow conductor by removing the proper amount of material from the coaxial cable.

SUMMARY OF THE INVENTION

A cable preparation tool having a main body, with a cable receiving end, a cable receiving area and a manipulation end. There is a center conductor support shaft guide channel in the manipulation end to receive a center conductor support shaft. The center conductor support shaft channel allows for the center conductor support shaft to enter a hollow center conductor of the cable and be removed from the hollow center conductor of the cable while the cable is within the cable receiving area. There is a jacket strip slot on the main body. There is a jacket strip blade attached at the jacket strip slot. There is a blade holder slot on the main body which receives a blade holder. There is a cable cutting blade attached to the blade holder. There is a cable slug slot on the main body.

BRIEF DESCRIPTION OF DRAWINGS

FIG. 10 FIG. 7 is a perspective exploded view of a cable preparation tool according to the present invention.

DESCRIPTION OF THE INVENTION

Figure 1:
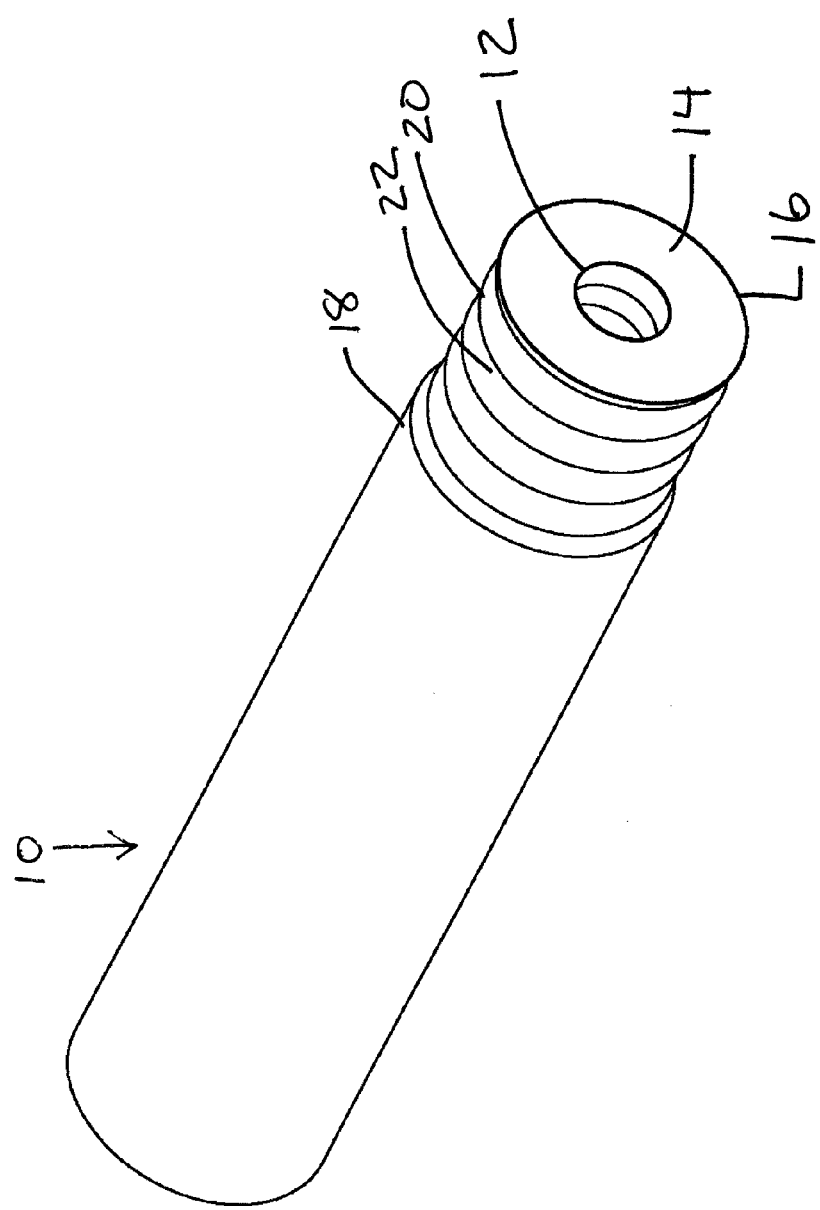
FIG. 1 is a perspective view of a coaxial cable used with the present invention.
Figure 2:
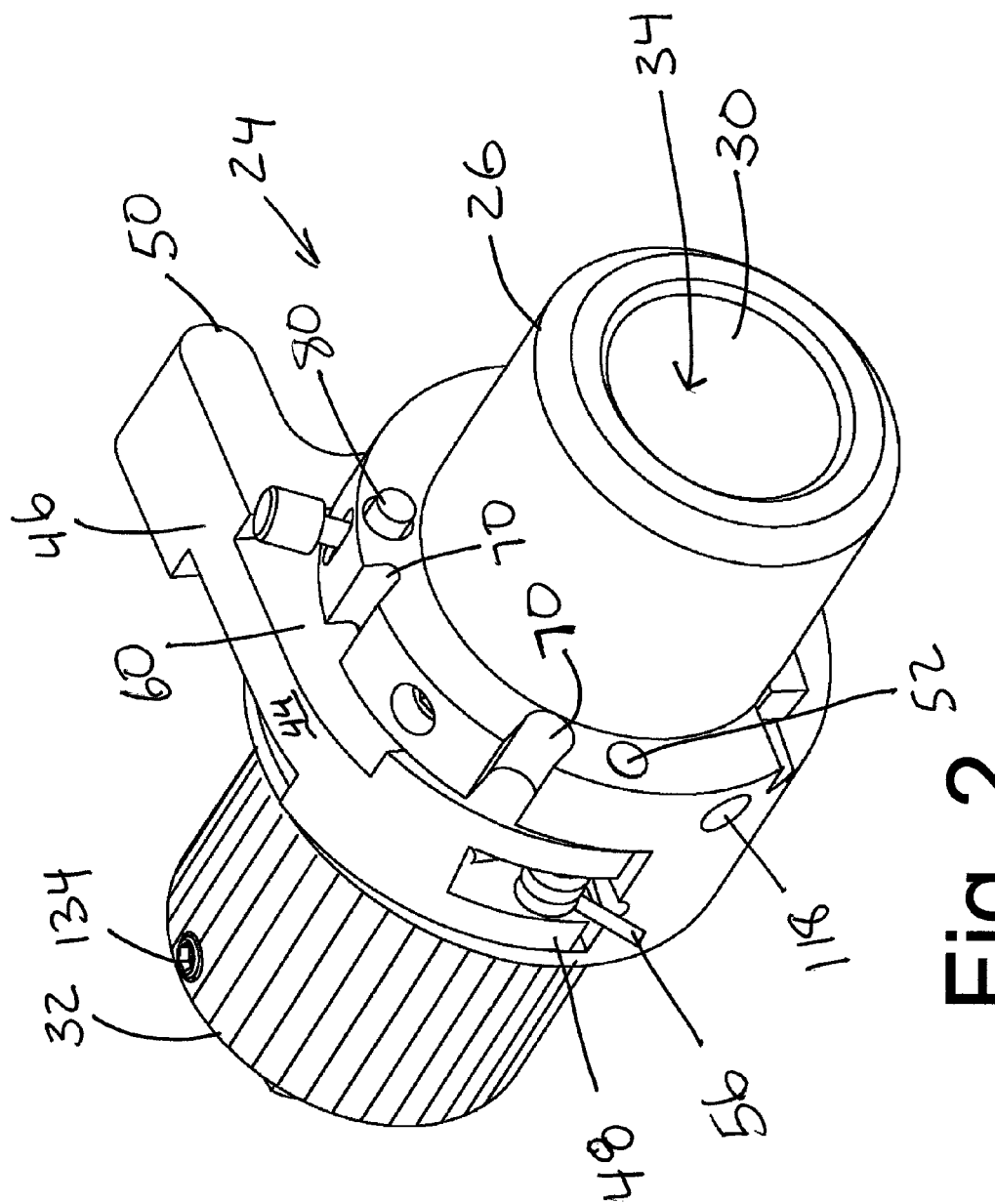
FIG. 2 is a perspective view of a cable preparation tool according to the present invention.
Figure 3:
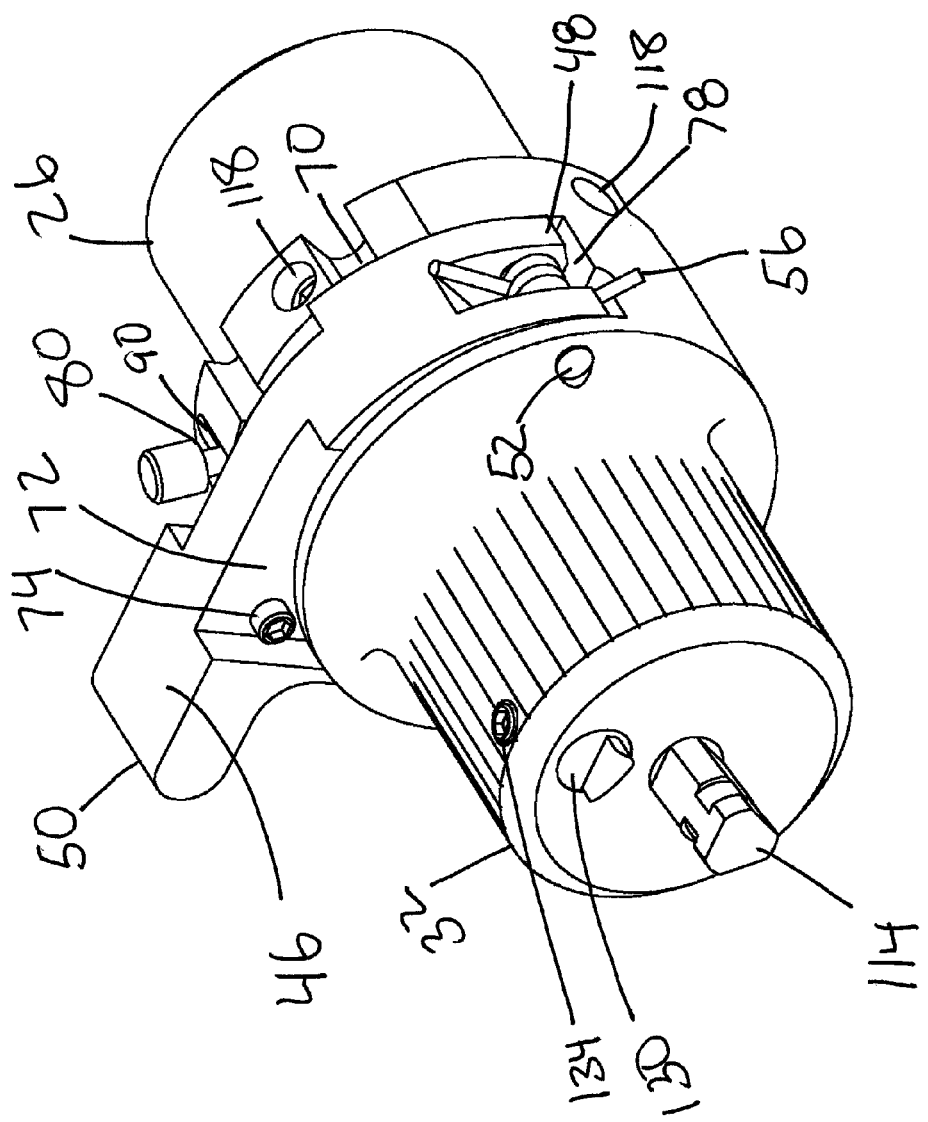
FIG. 3 is a perspective view of a cable preparation tool according to the present invention.
Figure 4:
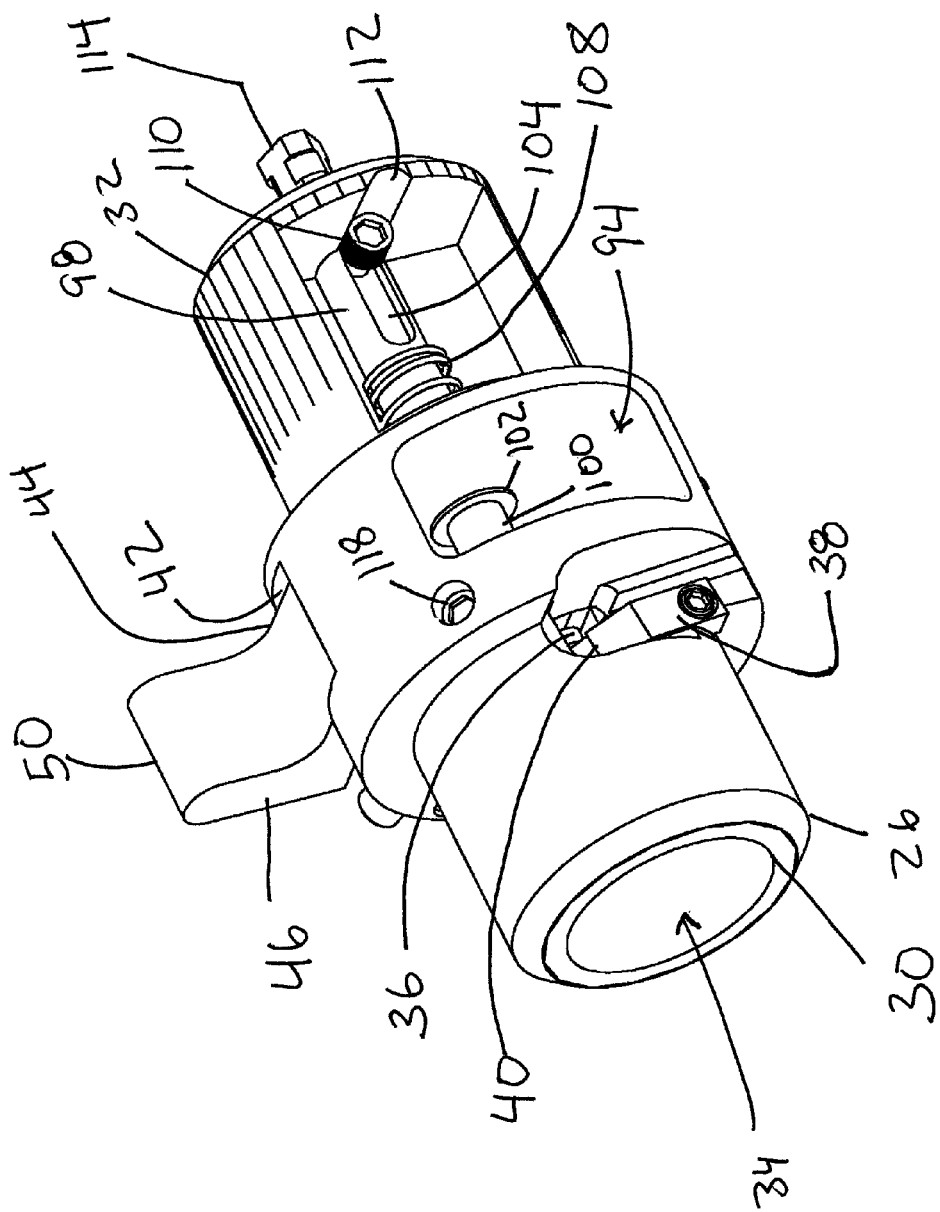
FIG. 4 is a perspective cutaway view of a cable preparation tool according to the present invention.

The present invention is a cable preparation tool which allows the preparation of the coaxial cable 10 having a hollow center conductor 12 and a corrugated outer conductor 16. The cable preparation tool allows the coaxial cable 10 to be prepared using one tool to remove the proper amount of outer jacket 18 and have the required amount of outer conductor 16 exposed. The cable preparation tool of the present invention is shown in FIGS. 2-15 and can also be used on coaxial cable with smooth outer conductors. FIGS. 2-4 show an assembled version of the cable preparation tool. FIGS. 2-4 show the cable preparation tool having a main body 24. The main body 24 includes a cable receiving end 26 to receive an end of the coaxial cable 10. The cable receiving end 26 includes an opening 30 to allow entrance of the coaxial cable 10 into the main body 24, as shown in FIGS. 1 and 4. The main body 24 includes a manipulation end 32 for turning the cable preparation tool during material removal from the coaxial cable 10, as shown in FIGS. 2-4. The manipulation end 32 is shown having a surface which is scribed to provided an improved gripping surface. The main body 24 also includes a cable receiving area 34 to perform material removal from the coaxial cable 10 which is accessed from the opening 30 of the cable receiving end 26, as shown in FIG. 5.

Figure 5:
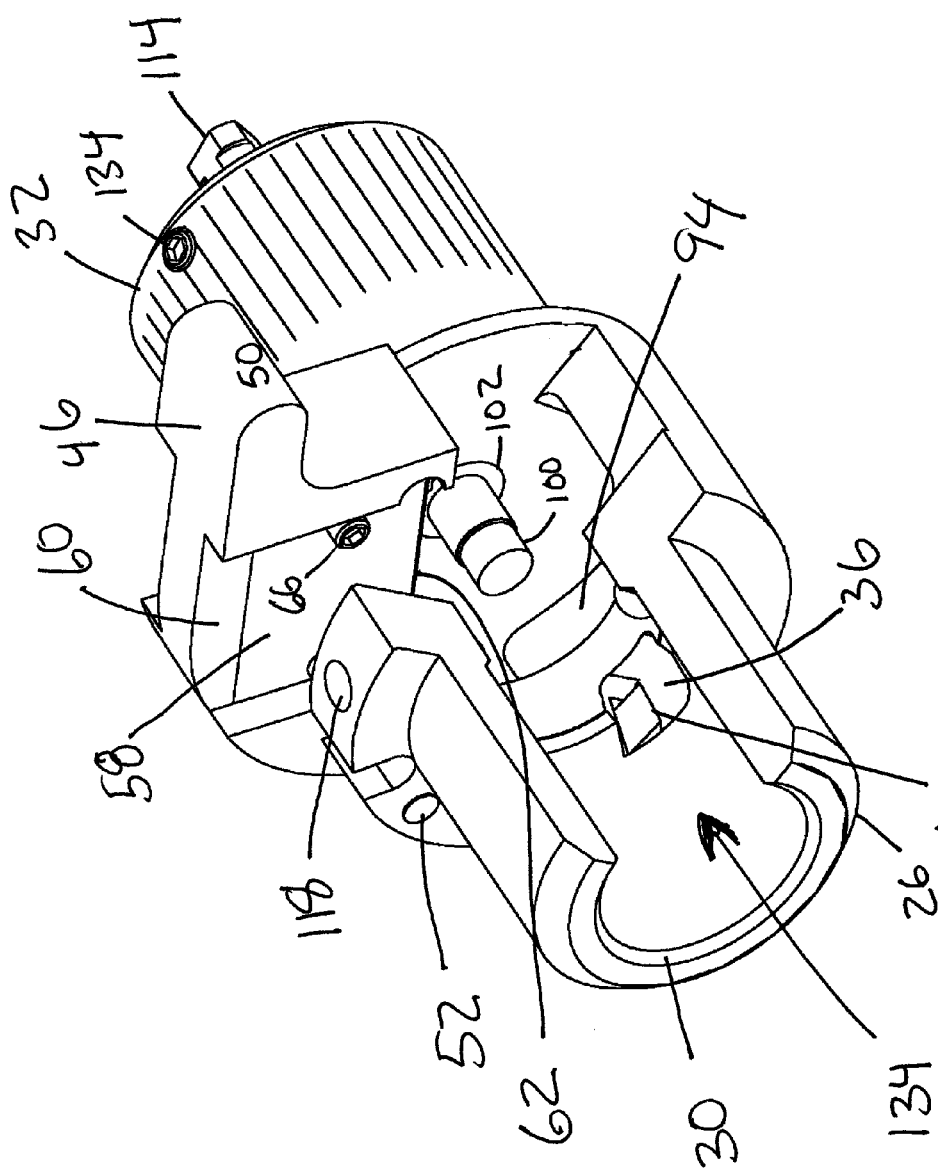
FIG. 5 is a perspective cutaway view of a cable preparation tool according to the present invention.

The main body 24 includes a jacket strip slot 36 that provides an opening to the cable receiving area 34, as shown in FIGS. 4-5. A jacket strip blade 38 is attached to the main body 24 at the jacket strip slot 36, as shown in FIGS. 4-5, 12-13 and 15. The jacket strip blade 38 has a cutting edge 40, as shown in FIGS. 4-5. The cutting edge 40 of the jacket strip blade 38 is positioned such that the cutting edge 40 enters the cable receiving area 34 at the jacket strip slot 36. The cutting edge 40 of the jacket strip blade 38 is used to strip the outer jacket 18 of the coaxial cable 10, while the cable preparation tool is rotated onto the coaxial cable 10. The main body 24 also includes a blade holder slot 42 which provides an opening to the cable receiving area 34, as shown in FIGS. 2-4, 6 and 11-12.

Figure 6:
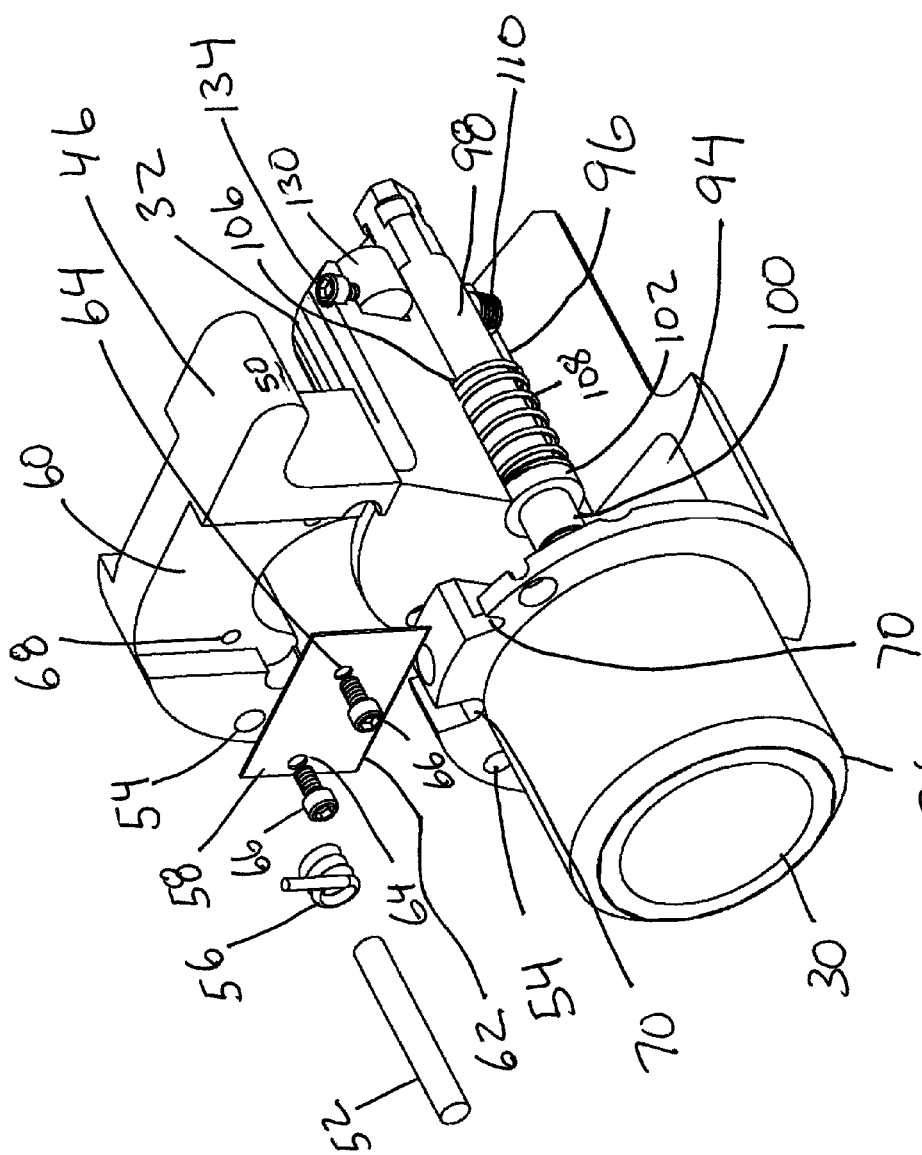
FIG. 6 is a perspective cutaway exploded view of a cable preparation tool according to the present invention.

A blade holder 44 is attached to the main body 24 at the blade holder slot 42, such the blade holder 44 can be moved into and out of the blade holder slot 42, as shown in FIGS. 2-15. The blade holder 44 has a round outside shape similar to the main body 24 and has a handle end 46 and a mounting end 48. The handle end 46 includes a tab 50 to allow the user to lift the blade holder 44. FIGS. 2-3, 5, 7-11 show the blade holder 44 pivotably attached to the main body 24 using a blade holder pin 52 at the mounting end 48. FIG. 6 shows the blade holder pin 52 and the blade holder pin holes 54 of the main body 24 and the blade holder 44. The blade holder 44 is biased into the blade holder slot 42 using the blade holder spring 56 shown in FIGS. 2-3, 7-8, and 11, which is mounted on the blade holder pin 52. The blade holder spring 56 presses against the blade holder 44 and the main body 24. FIG. 6 shows blade holder spring 56 removed from the blade holder pin 52.

Figure 7:
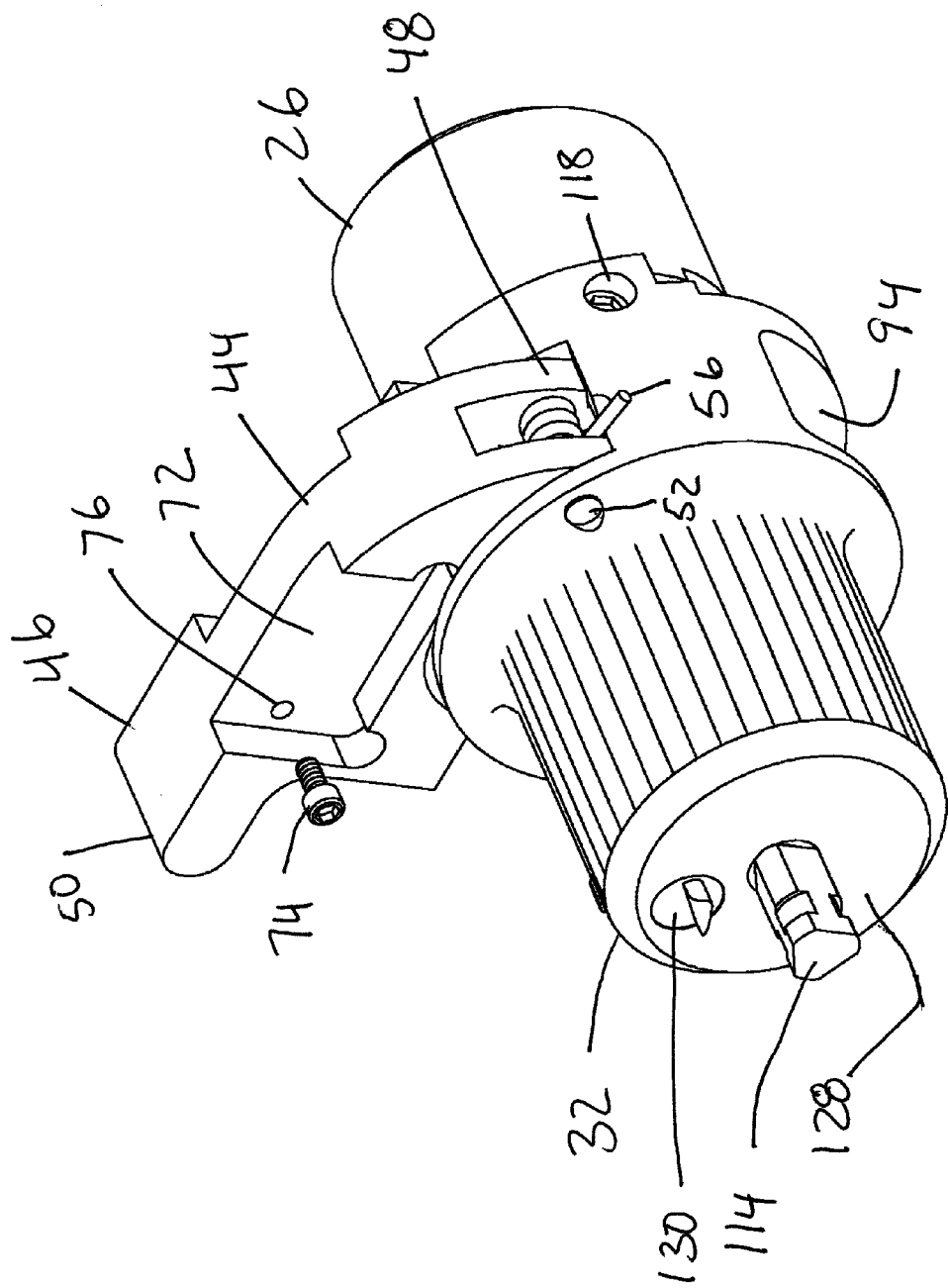
FIG. 7 is a perspective exploded view of a cable preparation tool according to the present invention.
Figure 8:
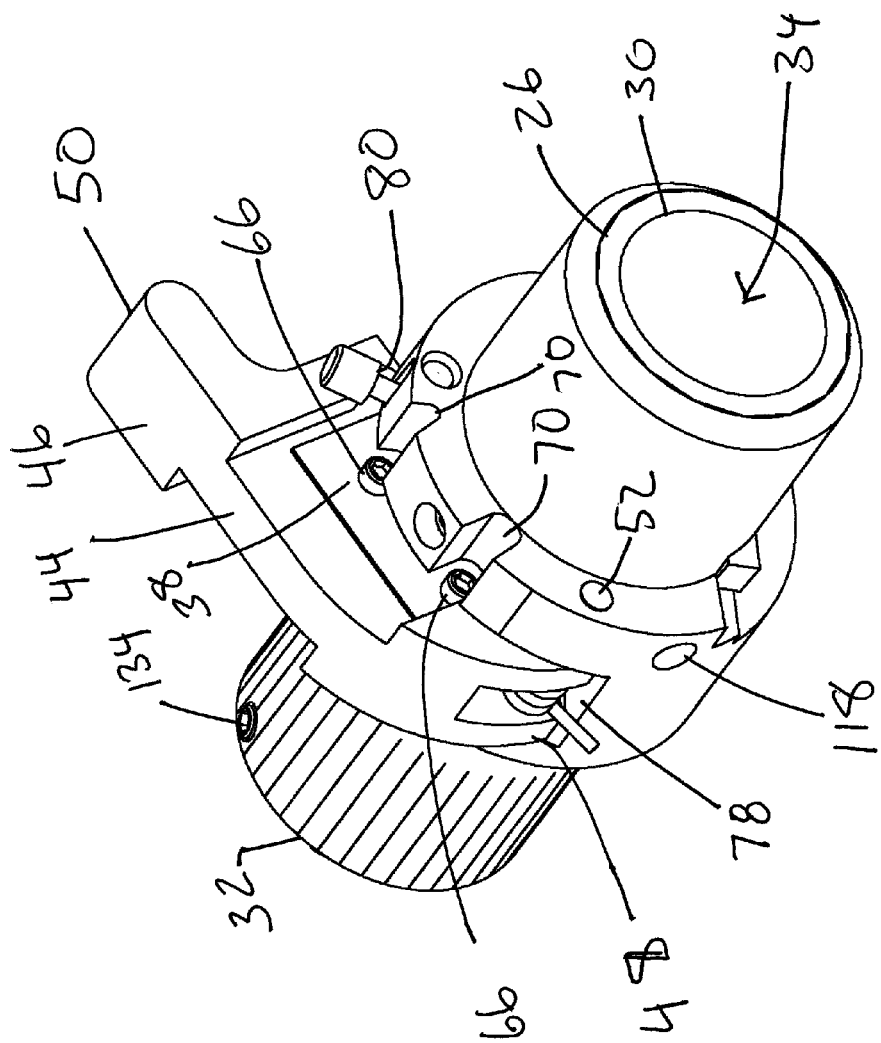
FIG. 8 is a perspective view of a cable preparation tool according to the present invention.

A cable cutting blade 58 is mounted to the blade mounting area 60 of the blade holder 44, as shown in FIG. 6. The cable cutting blade 58 is positioned on the blade holder 44 to cut through the coaxial cable 10 in the cable receiving area 34 when the blade holder 44 is lower in the blade holder slot 42. The cable cutting blade 58 is also positioned on the blade holder 44 such to avoid the coaxial cable 10 in the cable receiving area 34, when the blade holder 44 is higher in the blade holder slot 42. The cable cutting blade 58 includes a cutting edge 62 and mounting holes 64. Screws 66 secure the cable cutting blade 58 to blade holder 44 using screw holes 68 within the blade mounting area 60. Note, there are hex key access cutouts 70 on the main body 24 to allow access to the screws 66, as shown in FIG. 8. The blade holder 44 also includes a blade storage area 72 as shown in FIG. 7. Screw 74 and screw hole 76 are used to secure additional cable cutting blades to the blade holder 44 within the blade storage area 72. The main body 24 includes a shoulder 78 in the blade holder slot 42 designed to make contact with the mounting end 48 of the blade holder 44, as shown in FIG. 8. When the mounting end 48 of the blade holder 44 contacts the shoulder 78 of the blade holder slot 42, the shoulder 78 acts as a stop and prevents further rotation of the blade holder 44 about the blade holder pin 52. Limiting the rotation of the blade holder 44 prevents the cable cutting blade 58 from being exposed beyond the main body 24.

Figure 9:
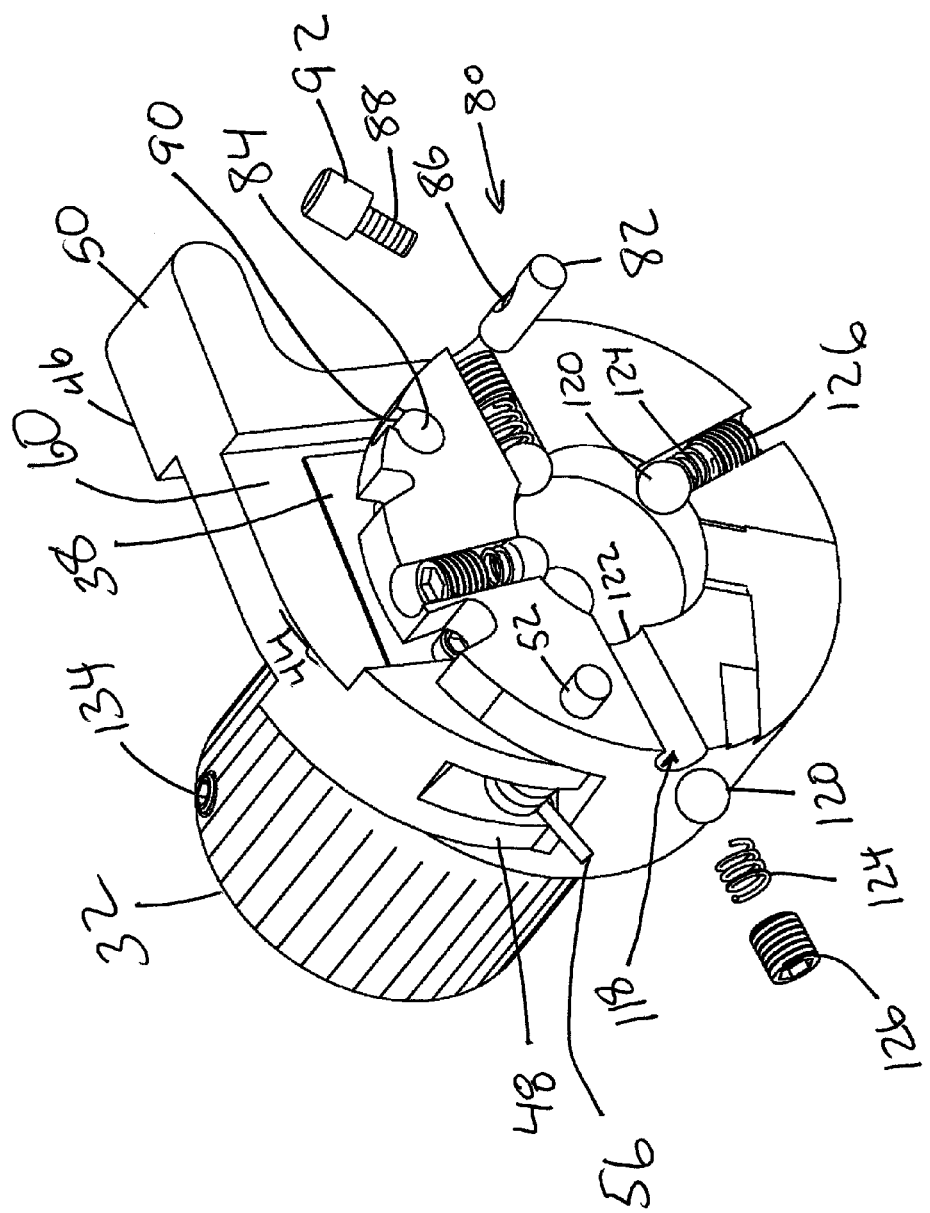
FIG. 9 is a perspective cutaway view of a cable preparation tool according to the present invention.
Figure 14:
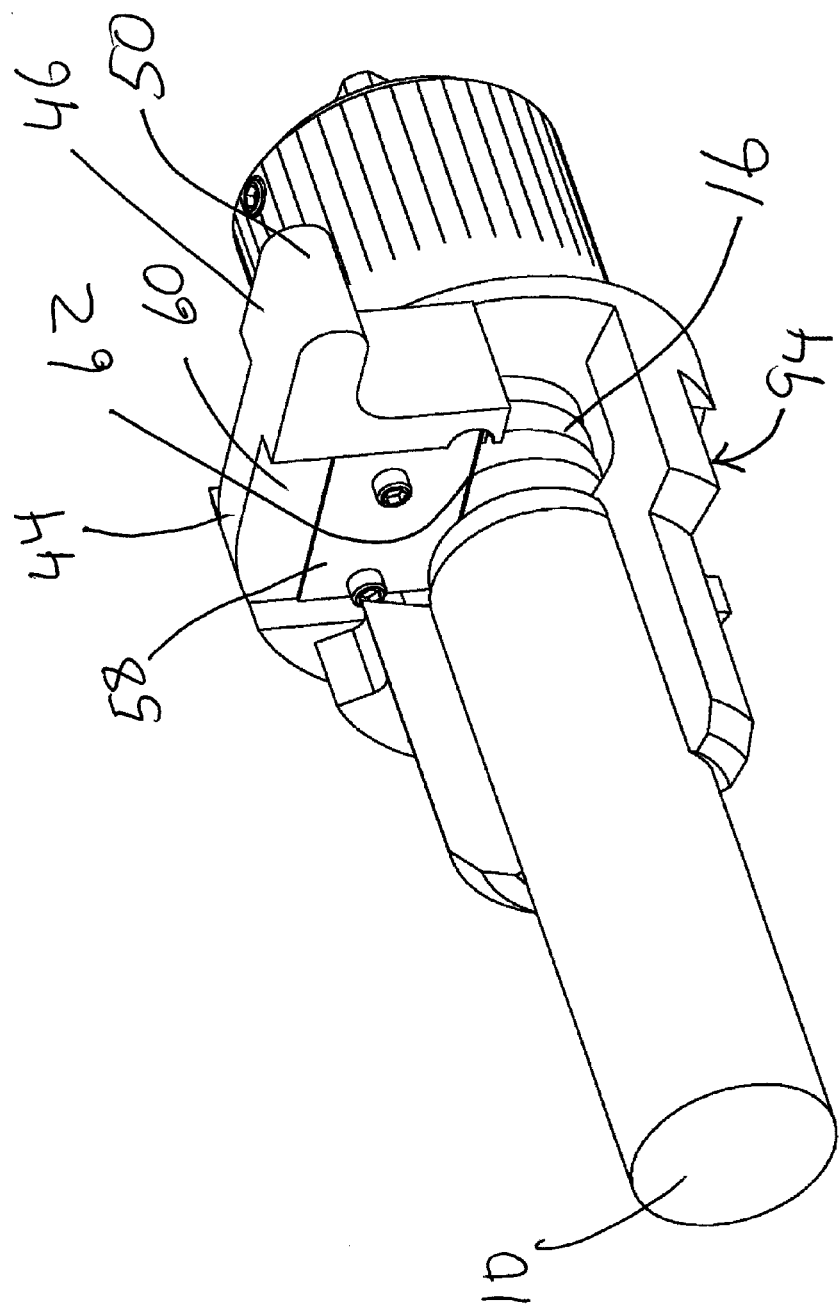
FIG. 14 is a perspective cutaway view of a cable preparation tool according to the present invention.
Figure 15:
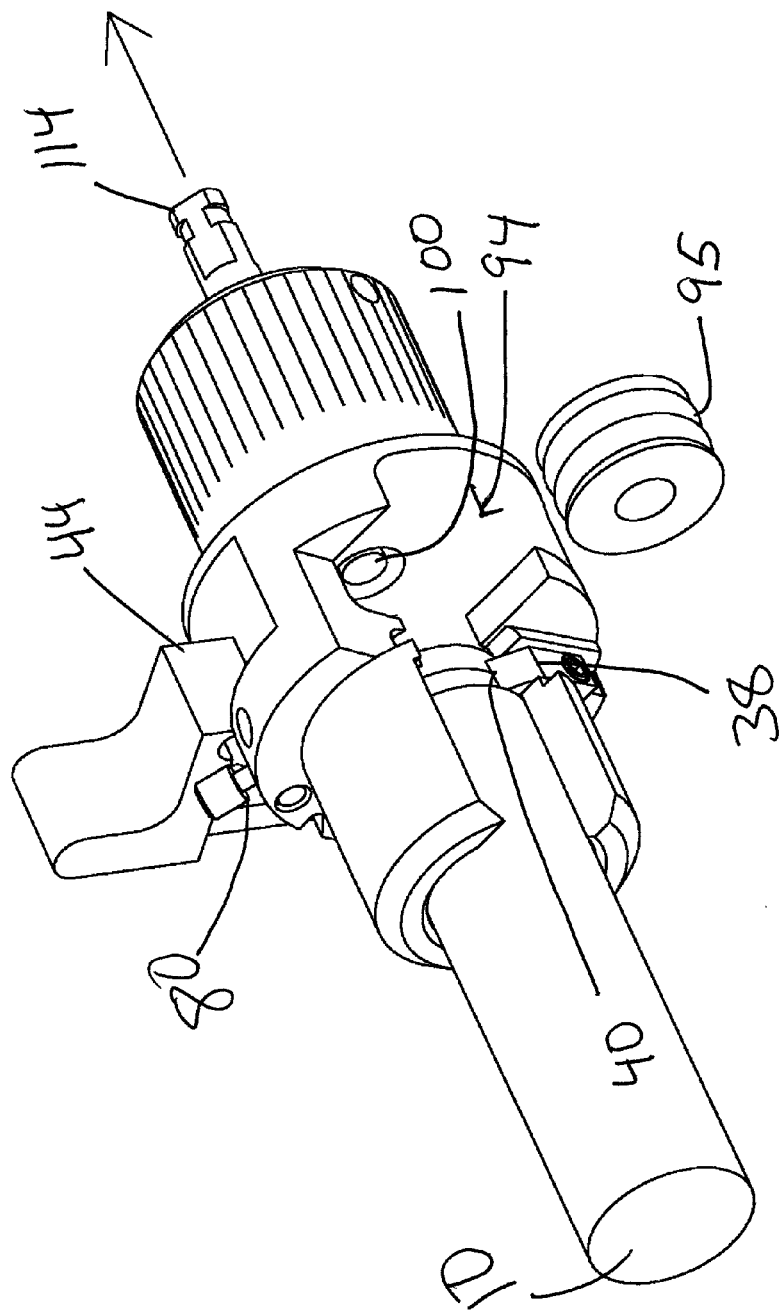
FIG. 15 is a perspective cutaway view of a cable preparation tool according to the present invention.

The main body 24 includes a blade holder lock 80, as shown in FIGS. 2-3, 8-13 and 15. As shown in FIG. 9, the blade holder lock 80 is a lock pin 82 which fits into a blade holder lock hole 84. The lock pin 82 includes a threaded hole 86 which receives a lock shaft 88, which is attached to the lock pin 82 through a lock shaft slot 90. The lock shaft 88 includes a lock knob 92. The lock pin 82, lock shaft 88, and lock shaft slot 90 combination retains the blade holder lock 80 in the blade holder lock hole 84. The blade holder lock hole 84 is position such that a portion of the lock pin 88 can be slid into the blade holder slot 42 and under the blade holder 44 when the blade holder 44 is higher in the blade holder slot 42. The main body 24 includes a cable slug slot 94, as shown in FIGS. 4-7 and 12-15. The cable slug slot 94 provides an opening to the cable receiving area 34. The cable slug slot 94 is large enough to allow removal of a cable slug 95 after the coaxial cable 10 has been cut using the cable cutting blade 58, as shown in FIG. 15.

Figure 11:
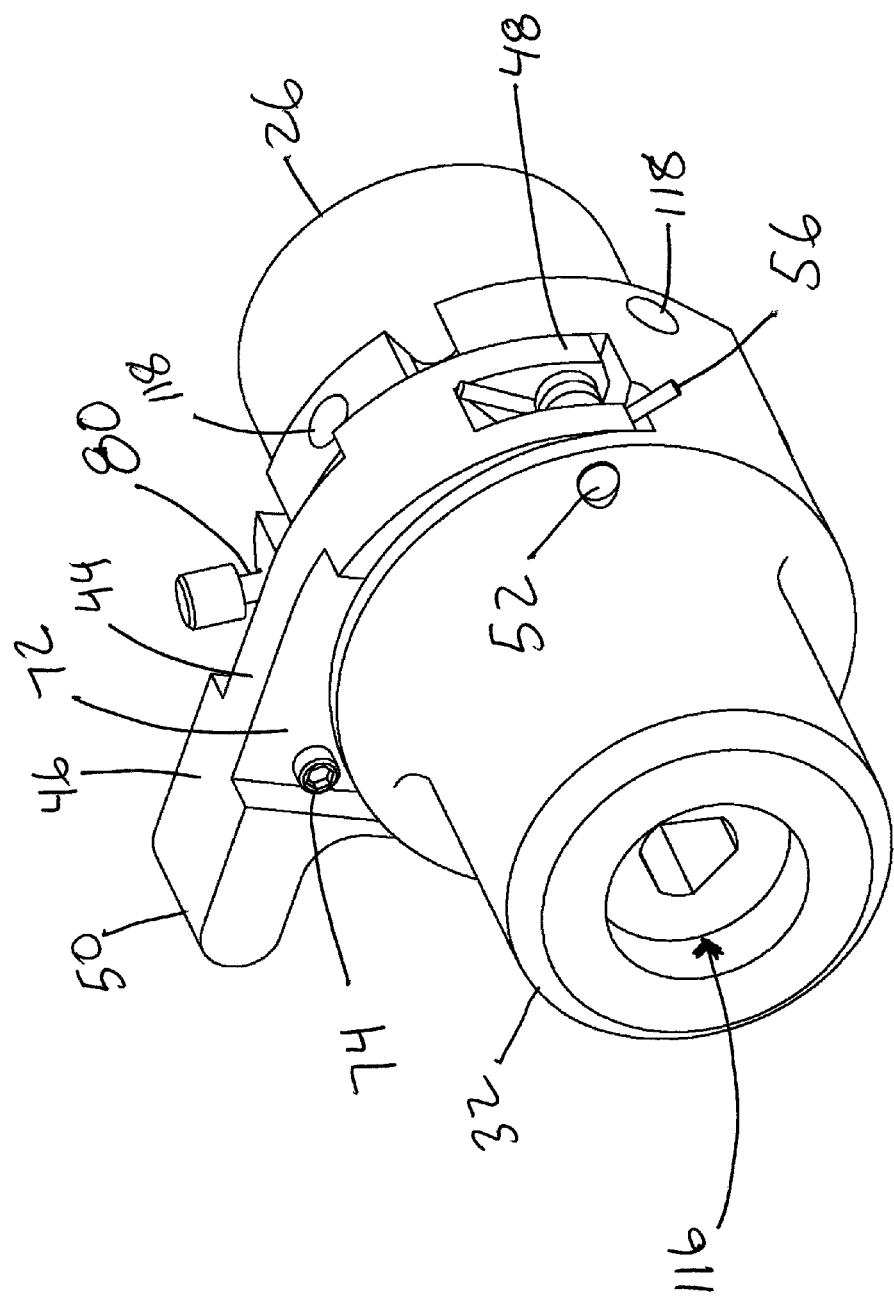
FIG. 11 is a perspective view of a cable preparation tool according to the present invention.
Figure 16:
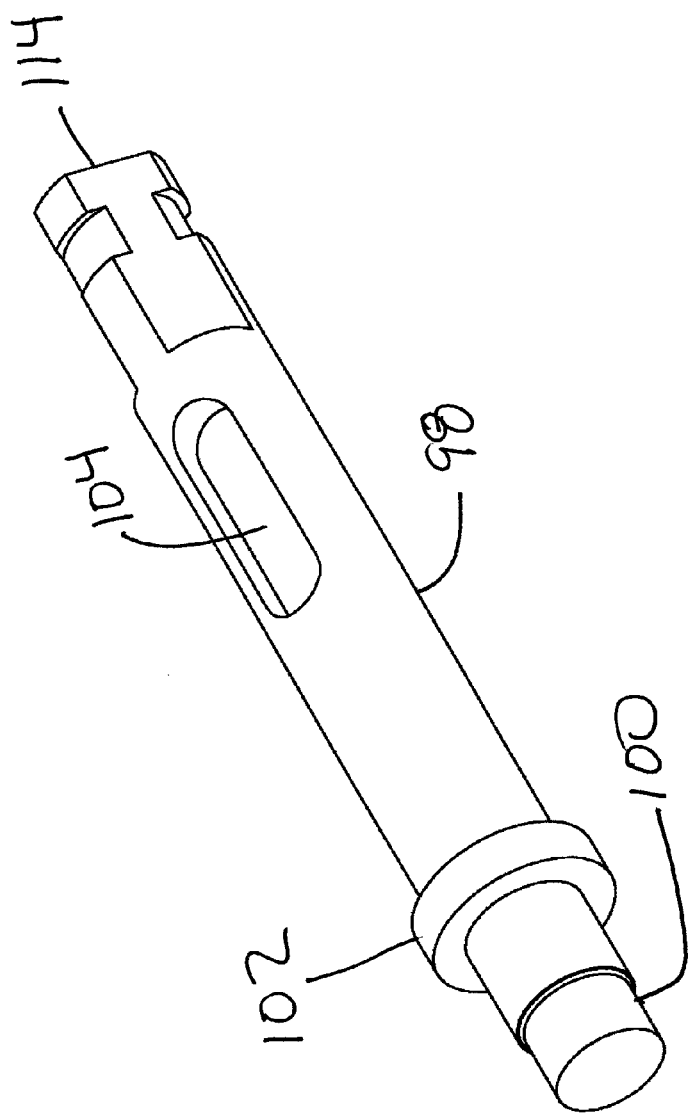
FIG. 16 is a perspective view of a center conductor support shaft used with a cable preparation tool according to the present invention.

The main body 24 includes a center conductor support shaft channel 96 in the manipulation end 32 to receive a center conductor support shaft 98, as shown in FIG. 6. The center conductor support shaft 98 is also shown in FIG. 16 and has a first end 100 sized to fit within the hollow center conductor 12 of the coaxial cable 10 during material removal. The center conductor support shaft channel 96 allows the center conductor support shaft 98 to be moved in and out of the cable receiving area 34, which is required to remove the cable slug 94. FIG. 6 shows one of the ways to make the center conductor support shaft 98 movable within the main body 24. The center conductor support shaft 98 includes a shoulder stop 102, as shown in FIGS. 6 and 16. The center conductor support shaft 98 includes set screw slot 104, as shown in FIGS. 4 and 16. The center conductor support shaft channel 96 includes a spring shoulder 106, as shown in FIG. 6. A support shaft spring 108 is used with the center conductor support shaft 98, as shown in FIG. 6. The center conductor support shaft 98 is inserted into the center conductor support shaft channel 96 from the cable receiving area 34 with the support shaft spring 108 installed. A set screw 110 is installed in a set screw hole 112 of the main body 24 such that the set screw 110 enters the set screw slot 104 on the center conductor support shaft 98, as shown in FIG. 4. The set screw 110 retains the center conductor support shaft 98 in the center conductor support shaft channel 96, yet allows the center conductor support shaft 98 to move due to the set screw slot 104. The support shaft spring 108 pushes against both the shoulder stop 102 and the spring shoulder 106 and forces the first end 100 of the center conductor support shaft 98 to remain in the cable receiving area 34, so that it is inserted into the hollow center conductor 12 of the coaxial cable 10. A force pulling on a second end 114 of the center conductor support shaft 98 and compressing the support shaft spring 108 against the spring shoulder 106 of the center conductor support shaft channel 96 allows removal of the first end 100 of the center conductor support shaft 98 from the cable receiving area 34. The second end 114 of the center conductor support shaft 98 which extends out of the manipulation end 32 of the main body 24 can be used to connect to a power tool or sized and shaped to enter the center conductor 12 to be used as a reshaping tool for the center conductor 12. Another example, of a removable center conductor support shaft 98, is to have an opening 116 in the manipulation end 32 of the main body 24 which leads to the center conductor support shaft channel 96, as shown in FIG. 11. Then, insert an external center conductor support shaft. The external center conductor support shaft would typically be similar to the center conductor support shaft 98 shown in FIG. 16 and could be attached to a power tool, such as a drill. The manipulation end 32 of the main body 24 shown in FIG. 11 can be designed to engage a power tool for use with the cable preparation tool.

The main body 24 includes a crest and valley locating system positioned as part of the main body 24 between the jacket strip blade 38 and the cable cutting blade 58. The crest and valley locating system is used to locate exposed crests 20 and valleys 22 of a corrugated outer conductor 16 of the coaxial cable 10. The crest and valley locating system allows for the control of trim dimensions for each component of the coaxial cable 10 without measuring. No matter whether the end of the coaxial cable 10 before preparation is cut off at the crest 20 or valley 22 of the outer conductor 16, the crest and valley locating system provides the correct trim dimensions for each component and positions the cable cutting blade 58 in the proper position along the crests 20 and valleys 22 of the outer conductor 16. One way to achieve the crest and valley locating system is to position several threaded holes 118 around the main body 24, which lead to the cable receiving area 34, as shown in FIG. 9. The holes 118 are large enough to receive balls 120. The cable receiving area end 122 of the holes 118 are reduced in size to only allow a portion of the balls 120 to extend into the cable receiving area 34. Ball springs 124 are inserted into the holes 118, followed by threading in set screws 126 to retain the balls 120 and ball springs 124. The balls 120 are of a diameter that will occupy the valley 22 of the corrugated outer conductor 16. The ball spring tension is such that as the cable preparation tool is rotated onto the coaxial cable 10, the balls 120 retract when passing over the crests 20 of the corrugated outer conductor 16 and do not damage the outer conductor 16 at the crests 20.

Figure 10:
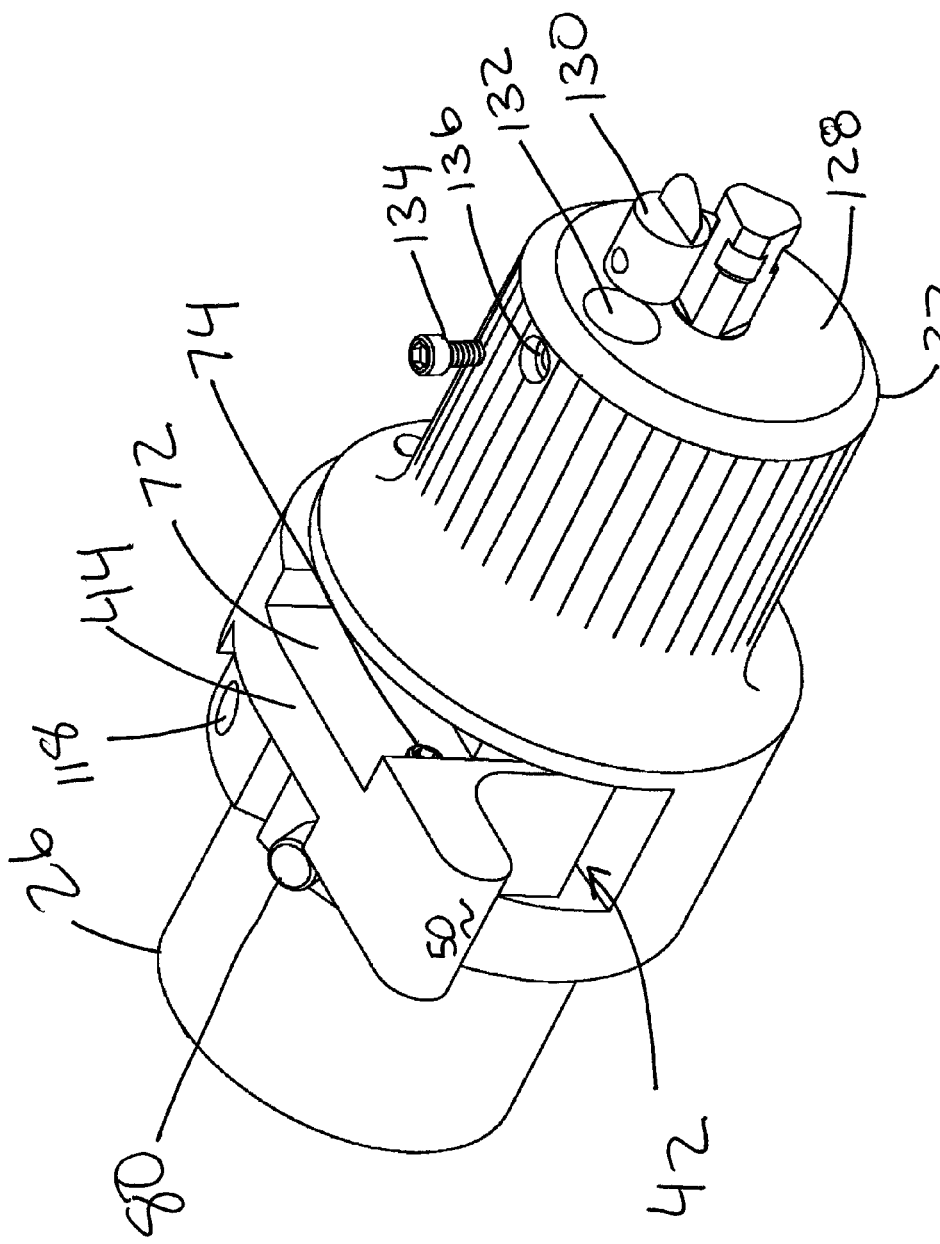

The manipulation end 32 of the main body 24 includes an accessory face 128 to receive accessories that can be mounted to the accessory face 128 to further condition the coaxial cable 10. FIGS. 3, 6-7 and 10 show a reshaping tool 130 to reshape the outer conductor 16 of the coaxial cable 10, as an example of an accessory that can be mounted to the accessory face 128. FIG. 10 shows the reshaping tool 130 fitting into an accessory hole 132 on the accessory face 128. The reshaping tool 130 is held in place with a set screw 134 using a set screw hole 136 that leads to the accessory hole 132.

Figure 12:
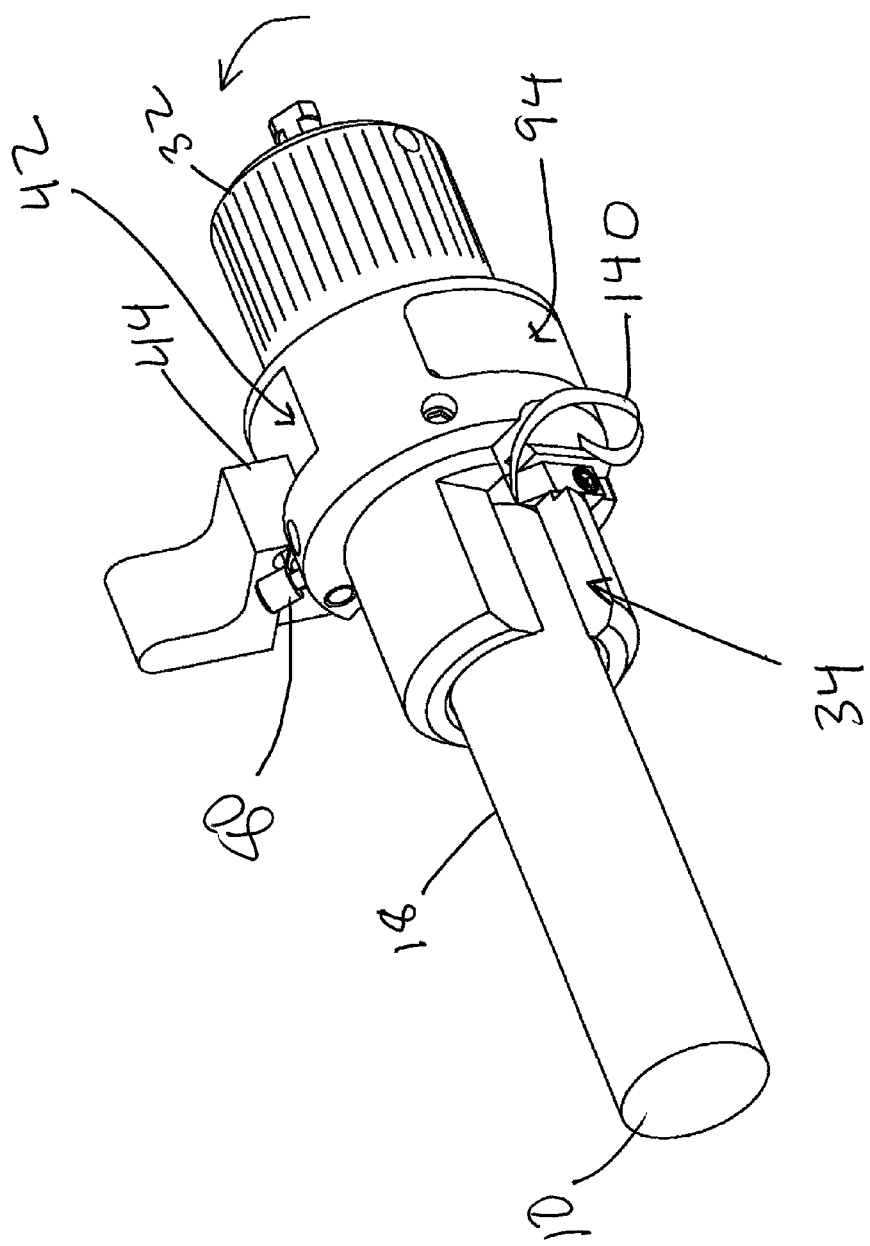
FIG. 12 is a perspective cutaway view of a cable preparation tool according to the present invention.
Figure 13:
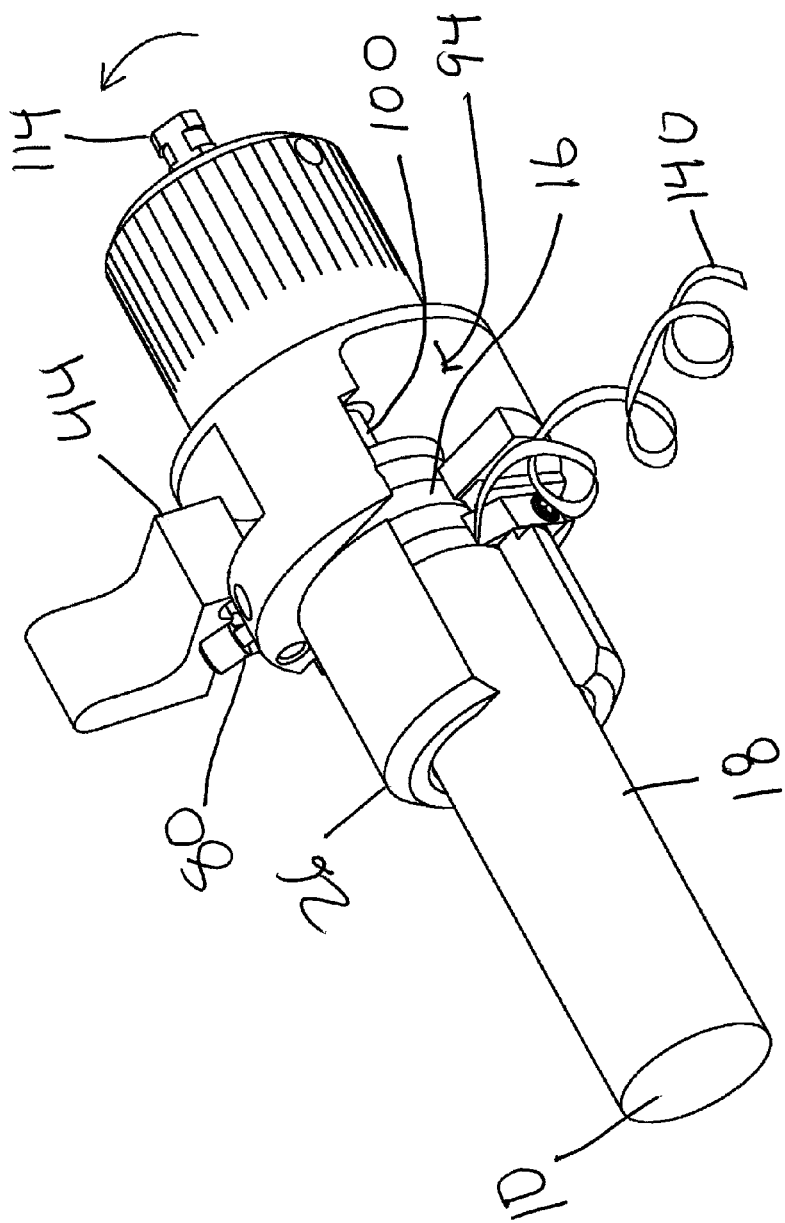
FIG. 13 is a perspective cutaway view of a cable preparation tool according to the present invention.

FIGS. 12-15 show the cable preparation tool in use. First, the cable preparation tool is placed over the coaxial cable 10, such that the coaxial cable 10 enters the opening 30 of the cable receiving end 26, as shown in FIG. 12. As the end 138 of the coaxial cable 10 gets near the jacket strip blade 38, the cable preparation tool is rotated in the direction indicated by the arrow in FIG. 12. The cable preparation tool can be rotated by hand using the gripping surface of the manipulation end 32 or by using a power tool attached to the cable preparation tool. The cutting edge 40 of the jacket strip blade 38 begins to remove the outer jacket 18 from the coaxial cable 10 to expose the outer conductor 16. The stripped outer jacket 140 exits out of the jacket strip slot 36. FIG. 13 shows the coaxial cable 10 progressing into the cable receiving area 34, whereby the corrugated outer conductor 16 moves pass the crest and valley locating system until a portion of the stripped coaxial cable 10 passes the cable cutting blade 58. At the same time the first end 100 of the center conductor support shaft 98 enters the hollow center conductor 12 and acts as a guide and provides support during rotation of the cable preparation tool. The user continues to rotate the cable preparation tool until the balls 120 of the crest and valley locating system come to rest in a valley 22 of the corrugated outer conductor 16. The required trim dimensions are controlled by the distance between the jacket strip blade 38 and the cable cutting blade 58, when the balls 120 are resting in a valley 22 of the outer conductor 16. If the outer conductor 16 were smooth, the trim dimension would just be the distance between the jacket strip blade 38 and the cable cutting blade 58. During rotation of the cable preparation tool up to this point, the blade holder 44 is locked in a higher position in the blade holder slot 42, such that the cable cutting blade 58 does not contact the coaxial cable 10. The blade holder 44 is locked in the higher position by pushing up on the tab 50 of the handle end 46 and sliding the blade holder lock 80 under the blade holder 44, as shown in FIG. 12. Once the coaxial cable 10 passes the cable cutting blade 58, the blade holder 44 is lowered into the blade holder slot 42. When the blade holder 44 is lower in the blade holder slot 42, the cutting edge 62 of the cable cutting blade 58 contacts the outer conductor 16, as shown in FIG. 14. The cable preparation tool is then rotated to have the cable cutting blade 58 cut through the outer conductor 16. The cutting edge 62 of the cable cutting blade 58 continues to lower into the blade holder slot 42, until it cuts through the hollow center conductor 12. After cutting through the hollow center conductor 12, the blade holder 44 is raised up and locked in the higher position in the blade holder slot 42. The part of the coaxial cable 10 that is cut off is the cable slug 96 that needs to be removed from the cable preparation tool, as shown in FIG. 15. To remove the cable slug 95, the center conductor support shaft 98 is pulled back in the center conductor support shaft channel 96, so that the center conductor support shaft 98 is removed from the coaxial cable 10 and the cable slug 95. Finally, the cable slug 95 is allowed to fall through the cable slug slot 94 from the cable preparation tool.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of any and all equivalents thereof.

We claim:

1. A cable preparation tool, adapted for stripping a coaxial cable having a jacket, outer conductor and a hollow center conductor, comprising:

a main body having a cable receiving end including an opening to allow entrance of the cable into said cable preparation tool, having a cable receiving area to perform material removal from the cable which is accessed from said opening of said cable receiving end and having a manipulation end for turning said cable preparation tool during material removal;

a center conductor support shaft channel in said manipulation end to receive a center conductor support shaft which is adapted to fit within the hollow center conductor of said cable during material removal, said center conductor support shaft channel configured to allow the center conductor support shaft to enter the hollow center conductor of said cable and be removed from the hollow center conductor of said cable while said cable is within said cable receiving area;

a jacket strip slot on said main body which provides an opening to said cable receiving area;

a jacket strip blade attached to said main body at said jacket strip slot, said jacket strip blade having a cutting edge, said cutting edge of said jacket strip blade positioned such that said cutting edge enters said cable receiving area at said jacket strip slot to allow stripping of the jacket of the cable while said cable preparation tool is rotated onto the cable;

a blade holder slot on said main body which provides an opening to said cable receiving area;

a blade holder attached to said main body at said blade hole slot such said blade holder can be moved into and out of said blade holder slot;

a cable cutting blade attached to said blade holder, said cable cutting blade positioned on said blade holder to cut through the cable in said cable receiving area when said blade holder is lower in said blade holder slot to produce a cable slug, said cable cutting blade positioned on said blade holder to avoid the cable in said cable receiving area when said blade holder is higher in said blade holder slot;

a cable slug slot on said main body which provides an opening to said cable receiving area; said cable slug slot large enough to allow removal of the cable slug after it is cut using said cable cutting blade.

2. The cable preparation tool of claim 1, further including a crest and valley locating system positioned between said jacket strip blade and said cable cutting blade as part of the main body and adapted for locating exposed crests and valleys of a corrugated outer conductor of the cable.

3. The cable preparation tool of claim 2, wherein said crest and valley locating system includes at least one valley locator unit extending into said cable receiving area, said valley locator unit movable from a crest of said cable as said crest contacts said valley locator unit; and a spring that biases said valley locator unit into said cable receiving area.

4. The cable preparation tool of claim 2, wherein said crest and valley locating system includes at least one hole in said main body extending into said cable receiving area; wherein a ball in said hole acts as said at least one valley locator unit, said ball having at least part of a ball surface of said ball extending out said hole and into said cable receiving area; and wherein said spring biases said ball surface into said cable receiving area.

5. The cable preparation tool of claim 1, wherein said cable slug slot is opposite said blade holder slot and directly below said cable cutting blade.

6. The cable preparation tool of claim 1, wherein said blade holder includes a storage area for storage of additional cable cutting blade.

7. The cable preparation tool of claim 1, wherein said blade holder includes a spring connected between said main body and said blade holder to bias said blade holder in said blade holder slot.

8. The cable preparation tool of claim 1, wherein said blade holder is attached about a pivot point on said main body such that said blade holder can be raised and lower within said blade holder slot due to rotation about said pivot point.

9. The cable preparation tool of claim 8, wherein said blade holder includes a spring connected between said main body and said blade holder to bias said blade holder in said blade holder slot.

10. The cable preparation tool of claim 8, wherein an end of said blade holder and a portion of said main body contact during rotation of said blade holder to act as a stop to prevent said cable cutting blade to be exposed beyond an outside of said main body and restricting said cable cutting blade to an area within said blade holder slot.

11. The cable preparation tool of claim 1, wherein said main body includes a blade holder lock near said blade holder to engage and hold said blade holder in a locked position when said blade holder is higher in said blade holder slot to prevent contact between said cable cutting blade and the cable.

12. The cable preparation tool of claim 1, further including a center conductor support shaft mounted in said center conductor support shaft channel, said center conductor support shaft including a first end and a second end, said first end of said center conductor support shaft movably extending into said cable receiving area and adapted to fit within the hollow inner conductor of the cable to act as a guide during rotation of said cable preparation tool about the cable, said second end being inserted within said center conductor support shaft channel.

13. The cable preparation tool of claim 12, further including a center conductor support shaft spring in said cable preparation tool which biases said center conductor support shaft into the hollow inner conductor of the cable.

14. The cable preparation tool of claim 12, wherein said center conductor support shaft includes a set screw slot between said first end and said second end, said set screw slot to receive a set screw which penetrates said center conductor support shaft channel to retain said center conductor support shaft in said center conductor support shaft channel, yet allow said center conductor support shaft to slide in said center conductor support shaft channel.

15. The cable preparation tool of claim 13, wherein said center conductor support shaft includes a set screw slot between said first end and said second end, said set screw slot to receive a set screw which penetrates said center conductor support shaft channel to retain said center conductor support shaft in said center conductor support shaft channel, yet allow said center conductor support shaft to slide in said center conductor support shaft channel.

16. The cable preparation tool of claim 12, wherein said second end of said center conductor support shaft includes a inner conductor reshaping end which extends out from said manipulation end of said main body and is shaped to enter and reshape the inner conductor of the cable.

17. The cable preparation tool of claim 1, wherein said manipulation end of said main body includes an accessory face to receive accessories mounted to said accessory face to further condition the cable.

18. The cable preparation tool of claim 17, wherein said accessory face includes a reshaping tool to reshape the outer conductor of the cable.

19. The cable preparation tool of claim 17, wherein said accessory face includes a reshaping tool to reshape the hollow inner conductor of the cable.

20. The cable preparation tool of claim 15, wherein said manipulation end of said main body includes an accessory face to receive accessories mounted to said accessory face to further condition the cable.

\* \* \* \* \*